United States Patent
Shi et al.

(10) Patent No.: US 12,165,514 B2
(45) Date of Patent: Dec. 10, 2024

(54) VEHICLE PARKING MANAGEMENT METHOD, ELETRONIC DEVICE, AND COMPUTER STORAGE MEDIUM

(71) Applicant: PATEO CONNECT+ TECHNOLOGY (SHANGHAI) CORPORATION, Shanghai (CN)

(72) Inventors: Hongren Shi, Shanghai (CN); Huan Li, Shanghai (CN); Peixin Lu, Shanghai (CN)

(73) Assignee: PATEO CONNECT+ TECHNOLOGY (SHANGHAI) CORPORATION, Shanghai (CN)

( * ) Notice: Subject to any disclaimer, the term of this patent is extended or adjusted under 35 U.S.C. 154(b) by 201 days.

(21) Appl. No.: 17/774,461

(22) PCT Filed: Dec. 31, 2019

(86) PCT No.: PCT/CN2019/130645
§ 371 (c)(1),
(2) Date: May 4, 2022

(87) PCT Pub. No.: WO2021/109307
PCT Pub. Date: Jun. 10, 2021

(65) Prior Publication Data
US 2023/0030600 A1    Feb. 2, 2023

(30) Foreign Application Priority Data
Dec. 4, 2019    (CN) .......................... 201911228326.9

(51) Int. Cl.
*G08G 1/14*    (2006.01)
*G06Q 30/0207*    (2023.01)
(Continued)

(52) U.S. Cl.
CPC .......... *G08G 1/148* (2013.01); *G06Q 30/0207* (2013.01); *G06V 20/54* (2022.01);
(Continued)

(58) Field of Classification Search
CPC ............. G08G 1/148; G08G 1/096861; G08G 1/143; G08G 1/144; G08G 1/146; G06V 20/54; G06V 20/625; G06V 2201/08
(Continued)

(56) References Cited

U.S. PATENT DOCUMENTS

| | | | |
|---|---|---|---|
| 2002/0171562 A1 | 11/2002 | Muraki | |
| 2016/0171891 A1* | 6/2016 | Banatwala | G08G 1/144 340/932.2 |
| 2018/0039974 A1 | 2/2018 | Powell | |
| 2020/0380864 A1* | 12/2020 | Yan | G06V 20/40 |
| 2021/0223058 A1* | 7/2021 | Horihata | G01C 21/3635 |

FOREIGN PATENT DOCUMENTS

| | | |
|---|---|---|
| CN | 103400508 | 11/2013 |
| CN | 204516053 U * | 7/2015 |

(Continued)

OTHER PUBLICATIONS

International Search Report for Application No. PCT/CN2019/130645, mailed Aug. 28, 2020 (7 pages).
(Continued)

*Primary Examiner* — Kam Wan Ma
(74) *Attorney, Agent, or Firm* — NIXON PEABODY LLP; Jeffrey L. Costellia

(57) ABSTRACT

A vehicle parking management method, comprising: on at least one of a vehicle and a mobile device, acquiring current parking place information and a plurality of additional information of a parking lot, the current parking place information at least comprising a location of an unoccupied parking place, each additional information in the plurality of additional information being configured for identifying associated data; on the basis of the current parking place
(Continued)

information and the additional information, generating a parking place distribution image, the parking place distribution image at least indicating the unoccupied parking place and the additional information; presenting the parking place distribution image; and in response to that an operation targeting the unoccupied parking place or the additional information is detected, generating a navigation indication related to a target unoccupied parking place.

7 Claims, 10 Drawing Sheets

(51) Int. Cl.
 *G06V 20/54* (2022.01)
 *G06V 20/62* (2022.01)
 *G08G 1/0968* (2006.01)
(52) U.S. Cl.
 CPC ..... *G06V 20/625* (2022.01); *G08G 1/096861* (2013.01); *G08G 1/143* (2013.01); *G08G 1/144* (2013.01); *G08G 1/146* (2013.01); *G06V 2201/08* (2022.01)
(58) Field of Classification Search
 USPC ....................................................... 340/932.2
 See application file for complete search history.

(56) References Cited

FOREIGN PATENT DOCUMENTS

| | | |
|---|---|---|
| CN | 106781674 | 5/2017 |
| CN | 107895506 | 4/2018 |
| CN | 108010373 | 5/2018 |
| CN | 108694853 | 10/2018 |
| CN | 108986538 | 12/2018 |
| CN | 109598973 | 4/2019 |
| CN | 109637177 | 4/2019 |
| CN | 109785654 | 5/2019 |
| JP | 2002-236948 | 8/2002 |
| JP | 2004-145717 | 5/2004 |
| JP | 2015-69429 | 4/2015 |
| JP | 5984076 | 9/2016 |
| JP | 2019-95242 | 6/2019 |
| JP | 2019-185463 | 10/2019 |

OTHER PUBLICATIONS

CN Office Action for Application No. CN 201911228326.9, mailed Dec. 3, 2021 (7 pages).
Chinese Office Action for Application No. 201911228326.9, mailed Aug. 22, 2022, (7 pages).
Japanese Office Action for Application No. 2022-526130, mailed Apr. 4, 2023 (9 pages).

* cited by examiner

VEHICLE PARKING MANAGEMENT METHOD, ELETRONIC DEVICE, AND COMPUTER STORAGE MEDIUM

TECHNICAL FIELD

The present disclosure generally relates to the field of vehicle management, and more particularly relates to a vehicle parking management method, an electronic device, and a computer storage medium.

BACKGROUND

Large indoor parking lots, especially underground parking lots in shopping malls, office buildings and supermarkets, have weak GPS signals, and are generally equipped with parking management systems to facilitate drivers to find suitable parking places.

Traditional solutions for vehicle parking management generally include two types. One solution is, for example, to use an indicator light above each parking place to indicate usage of the parking place (for example, when the indicator light is red, it indicates that the corresponding parking place is already occupied, and when the indicator light is green, it indicates that the corresponding parking place is empty). This method can only help the driver to observe whether there is an unoccupied parking place in a limited space near the vehicle. Usually, when the parking places are scarce, the driver needs to drive the vehicle around the parking lot several times in order to find a suitable unoccupied parking place, which is very time consuming. The other solution is, for example, to use a display board showing the number of unoccupied parking places to indicate a number of available unoccupied parking places in the whole parking lot or in a certain region of the parking lot. This method can only help the driver to know the number of the unoccupied parking places, but can't guide the driver to quickly find a suitable unoccupied parking place, which is very inconvenient.

In the above-mentioned traditional solutions for vehicle parking management, because only the usage of the parking places near the vehicle or the number of unoccupied parking places in a certain region of the parking lot may be indicated, the location of the unoccupied parking place cannot be directly indicated, which is not conducive for the driver to quickly find a suitable unoccupied parking place. Moreover, it is easy to cause the situations that there are few unoccupied parking places near elevators in shopping malls, office buildings and supermarkets, while the driving vehicles looking for parking places are very crowded, which can cause obstruction or scratching, and the unoccupied parking places that are a little farther away are not found or are idle. This is not conducive to the balanced use of the parking places in the parking lot.

Therefore, in the traditional solutions for vehicle parking management, it is not conducive to guiding the drivers to quickly find matching parking places, and is not conducive to the effective use of the parking places in the parking lot.

SUMMARY

The present disclosure provides a vehicle parking management method, an electronic device and a computer storage medium, which can guide drivers to quickly find matching parking places and improve the balanced use of the parking places in parking lots.

According to a first aspect of the present disclosure, a vehicle parking management method is provided. The method includes: on at least one of a vehicle and a mobile device, acquiring current parking place information and a plurality of additional information of a parking lot, the current parking place information at least including a location of an unoccupied parking place, each additional information in the plurality of additional information being configured for identifying associated data, and the vehicle being associated with the mobile device; on the basis of the current parking place information and the additional information, generating a parking place distribution image, the parking place distribution image at least indicating the unoccupied parking place and the additional information, and the additional information being configured to be associated with the location of the unoccupied parking place; presenting the parking place distribution image; and in response to that an operation targeting one of the unoccupied parking place and the additional information is detected, generating a navigation indication related to a target unoccupied parking place, the target unoccupied parking place being the unoccupied parking place targeted by the operation or the unoccupied parking place associated with the additional information targeted by the operation.

According to a second aspect of the present disclosure, a vehicle parking management method is provided. The method includes: at a server, determining current parking place information of a parking lot, the current parking place information at least including a location of an unoccupied parking place; configuring a plurality of additional information so that the additional information is associated with the location of the unoccupied parking place, each additional information in the plurality of additional information being configured for identifying associated data; sending the current parking place information and the plurality of additional information configured to at least one of a vehicle and a mobile device, the vehicle being associated with the mobile device; and on the basis of the current location information of the vehicle and a location of a target unoccupied parking place, generating navigation information related to the target unoccupied parking place so as to send the navigation information, the target unoccupied parking place being determined on the basis of an operation targeting the unoccupied parking place or the additional information on at least one of the vehicle and the mobile device.

According to a third aspect of the present disclosure, an electronic device is further provided, including: a memory configured for storing one or more computer programs; and a processor coupled to the memory and configured for executing the one or more programs to cause the device to execute the method according to any one of the first and second aspects of the present disclosure.

According to a fourth aspect of the present disclosure, a non-transitory computer-readable storage medium is further provided. A machine-executable instruction is stored on the non-transitory computer-readable storage medium, and the machine-executable instruction, when executed, causes the machine to execute the method according to any one of the first and second aspects of the present disclosure.

The summary part is provided to introduce the selection of concepts in a simplified form, which will be further described in the following detailed description. The summary part is not intended to identify key features or main features of the present disclosure, and is also not intended to limit the scope of the present disclosure.

BRIEF DESCRIPTION OF THE DRAWINGS

In each drawing, the same or corresponding symbols represent the same or corresponding parts.

DETAILED DESCRIPTION

Figure 1:
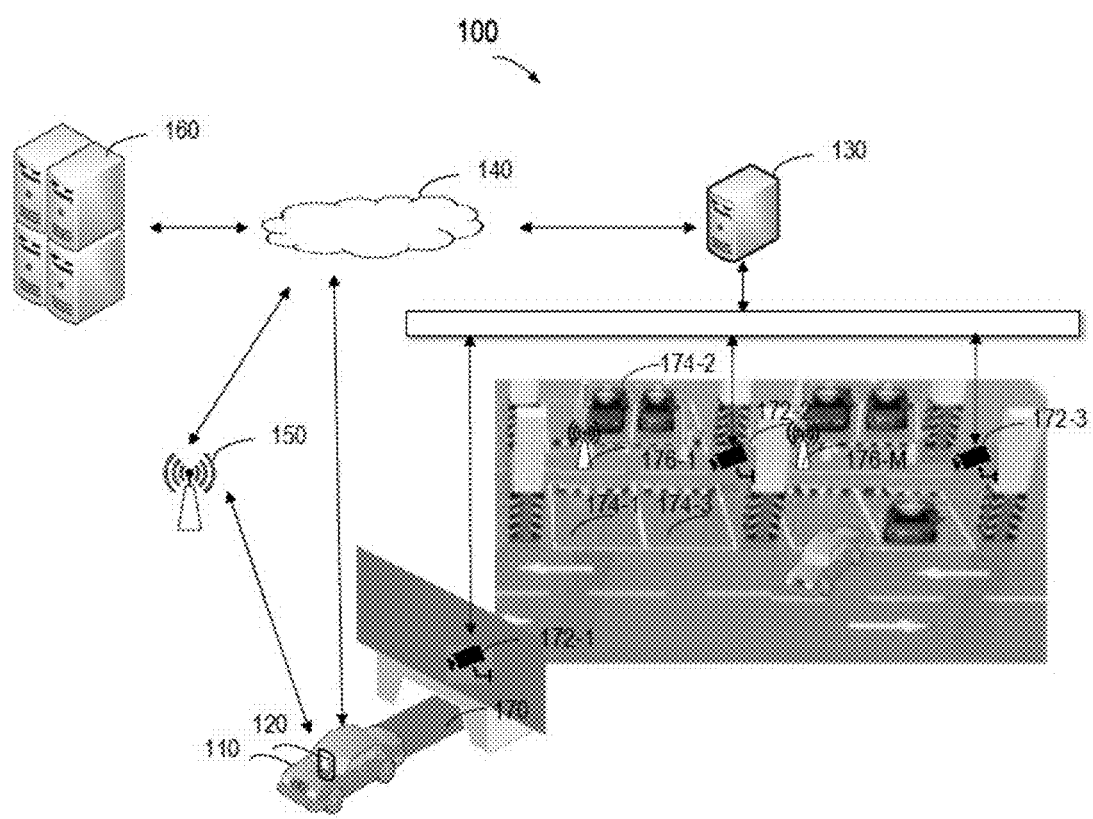
FIG. 1 illustrates a schematic diagram of a system 100 for implementing a vehicle parking management method according to an embodiment of the present disclosure.

The preferred embodiments of the present disclosure will be described in further detail hereinafter with reference to the drawings. Although the preferred embodiments of the present disclosure are shown in the drawings, it should be understood that the present disclosure may be embodied in various forms and should not be construed as limited to the embodiments set forth herein. On the contrary, these embodiments are provided to make the present disclosure more thorough and complete, and to fully convey the scope of the present disclosure to those skilled in the art.

The term "including" and similar terms thereof used herein represents open inclusion, which means, "including but not limited to". Unless specifically stated, the term "or" represents "and/or". The term "based on" represents "at least partially based on". The term "one exemplary embodiments" or "one embodiment" represent "at least one exemplary embodiment". The term "another embodiment" represents at least one other embodiment. The terms "first", "second", or the like, may refer to different or identical objects. Other explicit and implicit definitions may be probably included below.

As described above, in the above-mentioned traditional solutions for vehicle parking management, since the usage of parking places near the vehicle or the number of unoccupied parking places in a certain region of the parking lot can only be indicated by the indicator light, the locations of the unoccupied parking places cannot be directly indicated, which is not only unfavorable for the driver to quickly find a suitable unoccupied parking place, but also unfavorable for the effective and balanced use of the parking places in the parking lot.

To at least partially solve one or more of the above problems and other potential problems, the exemplary embodiments of the present disclosure propose a vehicle parking management solution. This solution includes: on at least one of a vehicle and a mobile device, acquiring current parking place information and a plurality of additional information of a parking lot, the current parking place information at least including a location of an unoccupied parking place, each additional information in the plurality of additional information being configured for identifying associated data, and the vehicle being associated with the mobile device; on the basis of the current parking place information and the additional information, generating a parking place distribution image, the parking place distribution image at least indicating the unoccupied parking place and the additional information, and the additional information being configured to be associated with the location of the unoccupied parking place; presenting the parking place distribution image; and in response to that an operation targeting one of the unoccupied parking place and the additional information is detected, generating a navigation indication related to a target unoccupied parking place, the target unoccupied parking place being the unoccupied parking place targeted by the operation or the unoccupied parking place associated with the additional information targeted by the operation.

In the foregoing solution, the unoccupied parking place and the additional information associated with the location of the unoccupied parking place are indicated by generating and presenting the parking place distribution image at the vehicle or the associated mobile device, and generating the navigation instruction when the operation targeting the unoccupied parking place or additional information is detected, so as to navigate the selected target unoccupied parking place or navigate the location of the unoccupied parking place associated with the selected additional information, so the present disclosure can quickly and effectively navigate the vehicle directly to the target unoccupied parking place. In addition, because the navigation instruction can guide the vehicle to the location of the target unoccupied parking place directly selected by the driver, and also guide the vehicle to the location of the unoccupied parking place associated with the additional information selected by the driver, the present disclosure can adjust selection of the driver on the target unoccupied parking place through the additional information, avoid over-concentration of the selection of the unoccupied parking place, and improve the effective utilization of the parking lot.

FIG. 1 illustrates a schematic diagram of a system 100 for implementing a vehicle parking management method according to an embodiment of the present disclosure. As shown in FIG. 1, the system 100 includes a vehicle 110, a mobile device 120, a server 130, a server 160, and a plurality of camera devices 172 (for example, specifically including 172-1, 172-2 to 172-N, wherein N is a natural number) of a parking lot. In some embodiments, the system 100 further includes a plurality of locating devices 176 (for example, specifically including 176-1 to 176-M, wherein M is a natural number). In some embodiments, the mobile device 120, the server 130, and the server 160 may, for example, perform data interaction via a base station 150 and a network 140.

The vehicle 110 at least includes: an on-board computer, an on-board data sensing device, and an on-board T-BOX. The on-board data sensing device is configured for sensing data of the vehicle and data of an external environment where the vehicle is located in real time.

The on-board T-BOX is configured for data interaction among the on-board computer, the mobile device 120, a roadside unit and the server 130. The on-board T-BOX, for example, includes an SIM card, a GPS antenna, a 4G or 5G antenna, and the like. When a user sends a control command (starting the vehicle remotely, turning on an air conditioner, adjusting a seat to a proper location, and the like) through an APP (Application) of the mobile device 120 (e.g., mobile phone), a TSP background will send a monitoring request command to the on-board T-BOX. After the vehicle receives the control command, a control message is sent through a CAN bus to control the vehicle, and finally an operation result is fed back to the mobile phone APP of the user. The on-board T-BOX communicates with the on-board computer through canbus to realize data interaction, such as transmitting vehicle status information, key status information, control instructions, or the like. The on-board T-BOX can collect bus data related to buses Dcan, Kcan and PTcan of the vehicle 110.

The on-board data sensing device, for example, includes a sensing device for sensing data of the vehicle and a sensing device for sensing environmental data of the vehicle. The sensing device for sensing the environmental data of the vehicle at least includes a plurality of camera devices for collecting environmental video data of the vehicle, such as a front camera and a rear camera of the vehicle which are configured for collecting an environment image in front of the vehicle (such as real-time foreground image) or an environment image at a rear of the vehicle, respectively.

The vehicle 110 and the mobile device 120 can interact and share data through wireless communication means such as Wi-Fi, bluetooth, and cellular. For example, the mobile device 120 is associated with the vehicle by a detected predetermined action (e.g., shaking) on the mobile device 120. By associating the mobile device 120 with the vehicle by the predetermined action (such as shaking), a connection between the vehicle and an associated mobile device of a specific user (such as the driver) may be established in a safe manner, thus facilitating sharing of data and computing resources. The vehicle 110 may send the data of the vehicle and the external environment data (for example, including environmental video data) collected by the data sensing device of the vehicle to the mobile device 120 after detecting that a distance of the mobile device 120 relative to the vehicle 110 is less than a predetermined value (for example, but not limited to, detecting that the mobile device 120 is inside the vehicle 110 or within a few meters outside the vehicle). By adopting the above means, unnecessary data interaction between the vehicle and the mobile device can be reduced. In some embodiments, when it is detected that the mobile device 120 is inside the vehicle 110, the on-board computer and the mobile phone may be interconnected through a USB communication technology.

Real-time data interaction is performed between the vehicle 110 and the server 130 through wireless communication technologies such as satellite wireless communication or mobile cellular. When a satellite wireless communication or mobile cellular signal in the indoor or underground parking lot is weak, the mobile device 120 or the vehicle 110 can perform data interaction with the server 130 through bluetooth signals provided by a plurality of locating devices 176 covering the parking lot. For example, the vehicle 110 directly acquires the current parking place information and the plurality of additional information of the parking lot from the server 130, or performs data interaction with the server 130 about the current parking place information and the plurality of additional information directly or via the mobile device 120.

The mobile device 120, is, for example, but not limited to a mobile phone. The terminal device 120 may directly perform data interaction with the on-board T-BOX, and may also perform data interaction with the server 130 and the server 160 via the base station 150 and the network 140. In some embodiments, the mobile device 120 may be a tablet computer. At the mobile device 120, for example, a predetermined action (e.g., shaking) is used to establish an association with the vehicle 110 and launch a predetermined application (e.g., virtual vehicle key APP). The mobile device 120 may also acquire the current parking place information and the plurality of additional information (each additional information being configured for identifying associated data) of the parking lot from the server 130. In some embodiments, the mobile device 120 may receive detection signals of the plurality of locating devices 176 in the parking lot through a bluetooth communication module, and feed the detection signals back to the server 130, so that the server 130 can determine the current location information of the vehicle 110 based on the feedback detection signals. In some embodiments, the mobile device 120 may also generate and display a parking place distribution image based on the received current parking place information and additional information, and indicate the unoccupied parking place and the additional information in the parking place distribution image. If the vehicle is already parked in a target unoccupied parking place, the mobile device 120 may also acquire associated data identified by the additional information associated with the target unoccupied parking place. In some embodiments, the association data is, for example, an identifier (e.g., a two-dimensional code, a bar code, or other forms of identifier) for generating discount information at the mobile device 120 for carrying out a transaction at an associated object (e.g., a merchant near the parking lot).

The server 130 is configured for vehicle parking management. The server 130, for example, is a management system of the parking lot. In some embodiments, the server 130 may be provided with one or more processing units, including special-purpose processing units such as GPU, FPGA and ASIC, and general-purpose processing units such as CPU. In addition, one or more virtual machines may also run on each computing device. In some embodiments, the server may determine the current parking place information of the parking lot. The current parking place information includes, for example, location information of a plurality of unoccupied parking places 174-1 and 174-3 and/or location information of a plurality of used parking places 174-2. The server 130 may also configure a plurality of additional information for being associated with the locations of the unoccupied parking places 174-1 and 174-3 respectively. The server 130 may also send the current parking place information and the plurality of configured additional information to the vehicle 110 and/or the mobile device 120 so as to display the parking place distribution image shown in FIG. 8 at the vehicle 110 and/or the mobile device 120. The server 130 may also generate navigation information related to the target unoccupied parking place on the basis of the current location information of the vehicle 110 and a location of the target unoccupied parking place. In some embodiments, if the server 130 determines that the vehicle 110 is already parked in the target unoccupied parking place (e.g., 174-1), information indicating that the vehicle 110 arrives at a location of the target unoccupied parking place 174-1 is sent to the vehicle 110 and/or the mobile device 120 for the mobile device 120 to acquire associated data associated with the target unoccupied parking place.

The server 160, for example, is configured for providing an IoV (Internet of Vehicles) service. The server 160, for example, performs data interaction with the server 130 via the network 140. In some embodiments, the server 160 may be provided with one or more processing units, including special-purpose processing units such as GPU, FPGA and ASIC, and general-purpose processing units such as CPU. In addition, one or more virtual machines may also run on each computing device. In some embodiments, the server 160 stores, for example, information of the vehicle 110 (e.g., at least including license plate information), and information of the mobile device 120 and a user associated with the vehicle 110. The server 130 may query information of the vehicle 110 and the mobile device 120 associated with the license plate information via the server 160.

The locating device 176 is configured for transmitting locating signals, and the locating device is, for example, a bluetooth locating device or an iBeacon locating device. In some embodiments, a plurality of locating devices 176 are preset at a plurality of predetermined locations of each of a plurality of multiple floors of the parking lot, so that signals (e.g., bluetooth signals) transmitted by the plurality of locating devices can cover the plurality of floors of the parking lot. The server 130 may pre-record the location of each of the plurality of locating devices 176-1 to 176-M as a locating reference location, and may identify each locating device on the basis of the signals of the locating devices, and on the basis of an detection signal regarding one or several locating devices fed back by an object (such as the mobile device 120 or the vehicle 110), determine a relative location between the object and the one or several locating devices.

Figure 2:
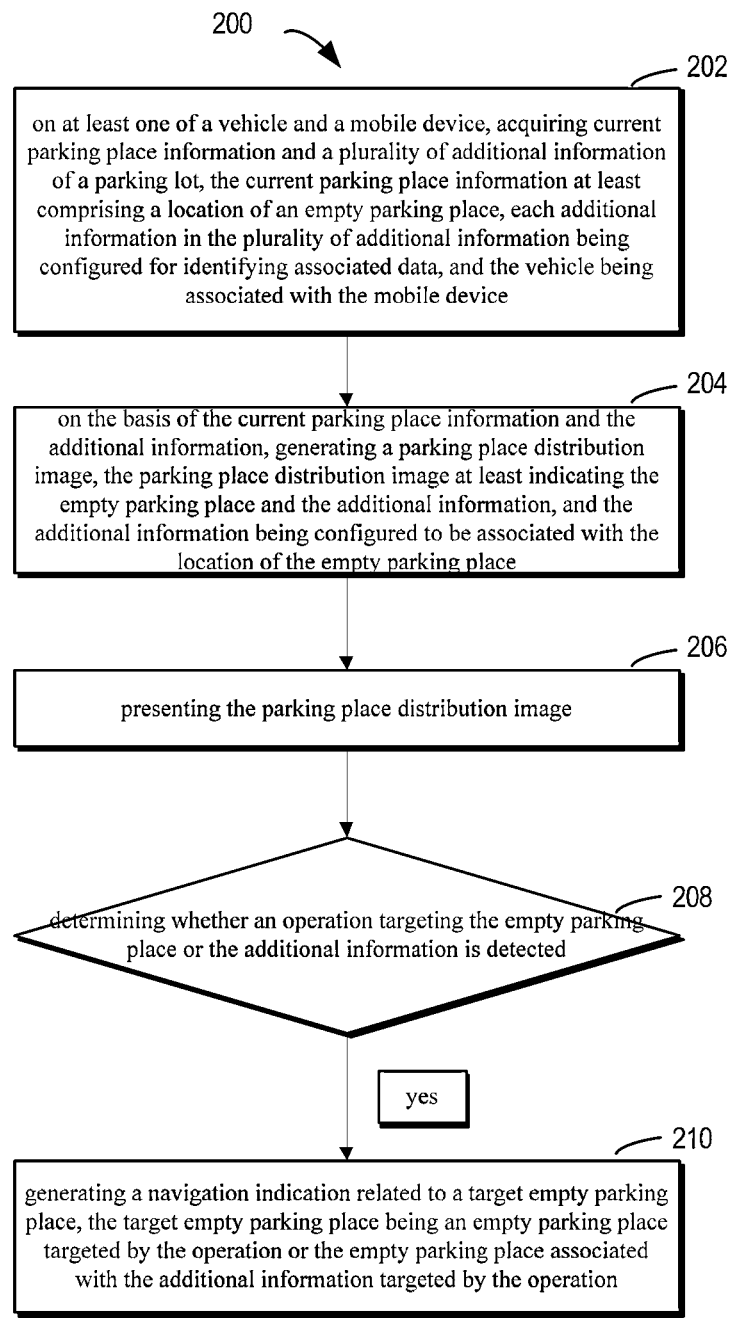
FIG. 2 illustrates a flow chart of a vehicle parking management method 200 according to an embodiment of the present disclosure.

A vehicle parking management method according to an embodiment of the present disclosure will be described below with reference to FIG. 2. FIG. 2 illustrates a flow chart of the vehicle parking management method 200 according to the embodiment of the present disclosure. It should be understood that the method 200, for example, may be performed at an electronic device 1000 described in FIG. 10. The method may also be executed at the mobile device 120 described in FIG. 1 or at the on-board computer of the vehicle 110. It should be understood that the method 200 may further include additional actions which are not shown and/or the illustrated actions may be omitted, and the scope of the present disclosure is not limited in this respect.

At box 202, on at least one of a mobile device 120 and an on-board computer of a vehicle 110, current parking place information and a plurality of additional information of a parking lot are acquired, the current parking place information at least including a location of an unoccupied parking place, each additional information in the plurality of additional information being configured for identifying associated data, and the vehicle 110 being associated with the mobile device 120.

In some embodiments, the mobile device 120 and the on-board computer of the vehicle 110 acquire map information and the plurality of additional information of the parking lot from the server 130. In some embodiments, the map information includes, for example, a map of parking places in a plurality of floors of the parking lot. The map information of the parking place identifies, for example, locations and/or numbers of all unoccupied parking places at current (e.g., unoccupied parking places 174-1 and 174-3). In some embodiments, the map information also identifies, for example, locations and/or numbers of occupied unoccupied parking places (e.g., occupied unoccupied parking place 174-2).

As for the additional information, in some embodiments, the associated data of each additional information is configured for generating an identifier (e.g., two-dimensional code, bar code) at the mobile device 120, for example. The identifier is configured for identifying transaction discount information of an associated object of the additional information. The associated object is, for example, one or more of a plurality of merchants in a shopping mall where the parking lot is located. The transaction discount information is, for example, a commodity coupon. In some embodiments, the additional information may also be, for example, an identifier for generating a parking fee at the mobile device 120. In some embodiments, the additional information may also be an identifier for paying a charging fee of a charging pile, and an unoccupied parking place associated with the additional information is, for example, an unoccupied parking place providing a charging pile for charging.

At box 204, the mobile device 120 and/or the on-board computer of the vehicle 110, on the basis of the current parking place information and additional information acquired, generates a parking place distribution image, the parking place distribution image at least indicating the unoccupied parking place and the additional information, and the additional information being configured to be associated with the location of the unoccupied parking place.

In some embodiments, the mobile device 120 and/or the on-board computer of the vehicle 110 renders an indication image and an additional image of the unoccupied parking place so as to present the additional image at the indication image of the unoccupied parking place, the additional image being configured for identifying the additional information associated with the unoccupied parking place, and at least one of the indication image and the additional image of the unoccupied parking place being operable.

Figure 8:
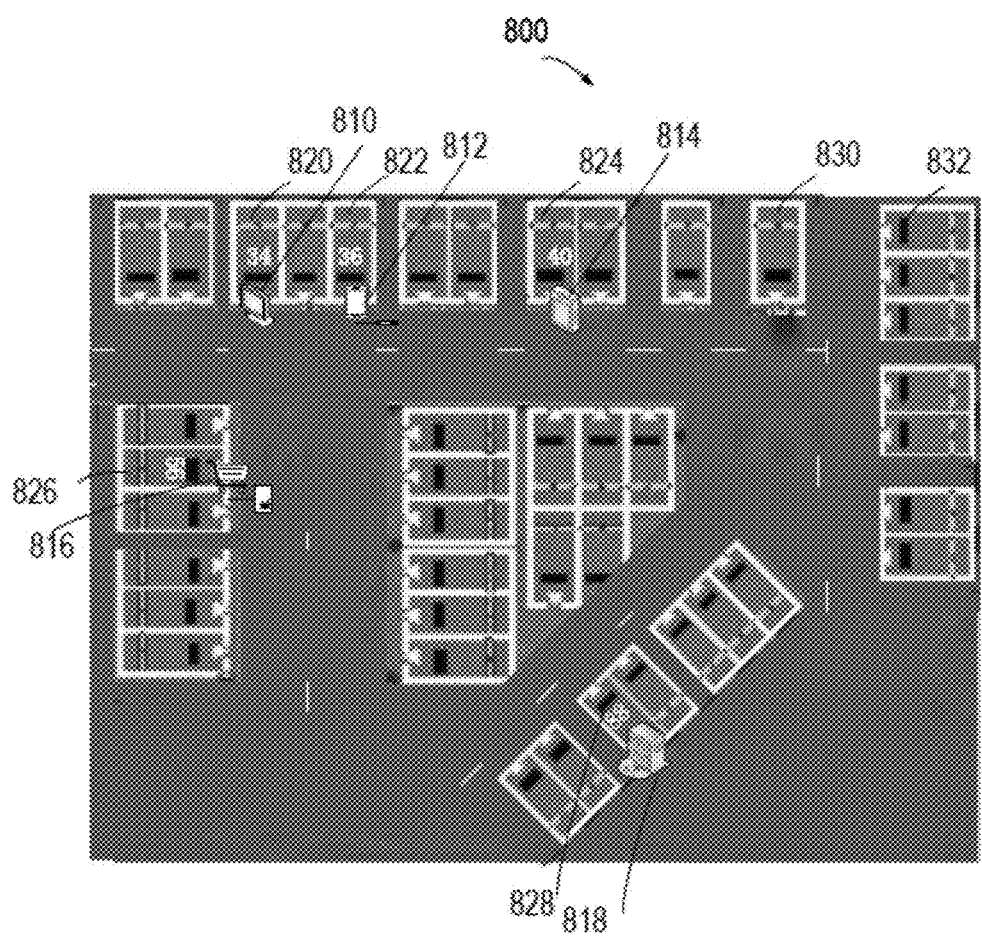
FIG. 8 illustrates a schematic diagram of a parking place distribution image 800 according to an embodiment of the present disclosure.

At box 206, the mobile device 120 and/or the on-board computer of the vehicle 110 presents the parking place distribution image. For example, the parking place distribution image is displayed at a display of the on-board computer of the vehicle 110. The parking place distribution image is illustrated hereinafter with reference to FIG. 8. FIG. 8 illustrates a schematic diagram of the parking place distribution image 800 according to an embodiment of the present disclosure. As shown in FIG. 8, the parking place distribution image 800, for example, is displayed on the mobile device 120 and/or the display of the vehicle 110. In the parking place distribution image 800, unoccupied parking places, such as unoccupied parking places 820, 822, 824, 826 and 828 with serial numbers of 34, 36, 40, 56 and 88 respectively are displayed. In some embodiments, besides the current unoccupied parking places, the parking place distribution image 800 also displays other occupied parking places, such as occupied parking places 830, 832 and other parking places without showing parking place serial numbers and reference numbers. In the parking place distribution image 800, associated additional information 810, 812, 814, 816 and 818 are displayed at locations of the unoccupied parking places 822, 824, 826 and 828 respectively. Illustratively, the additional information 810, for example, identifies transaction discount information of a merchant selling computers. The additional information 812, for example, identifies transaction discount information of a merchant repairing mobile phones. The additional information 814, for example, identifies charging discount information or charging payment information of a charging pile. The additional information 816, for example, identifies transaction discount information of a supermarket. The additional information 818, for example, identifies transaction discount information of a restaurant. In some embodiments, one unoccupied parking place may also be associated with a plurality of additional information. In some embodiments, icons corresponding to the unoccupied parking places 820,

822, 824, 826 and 828 and the additional information 810, 812, 814, 816 and 818 are operable for a driver to perform a predetermined operation (e.g., click operation) on the unoccupied parking place or the associated additional information.

At box 208, the mobile device 120 and/or the on-board computer of the vehicle 110 determines whether an operation targeting the unoccupied parking place or the additional information is detected.

At box 210, if the mobile device 120 and/or the on-board computer of the vehicle 110 determines that the operation targeting the unoccupied parking place or the additional information is detected, the mobile device 120 and/or the on-board computer of the vehicle 110 generates a navigation indication related to a target unoccupied parking place, the target unoccupied parking place being the unoccupied parking place targeted by the operation or the unoccupied parking place associated with the additional information targeted by the operation. For example, the on-board computer of the vehicle 110 detects that the driver performs click targeting the additional information 816, the on-board computer of the vehicle 110 determines that the unoccupied parking place 826 associated with the additional information 816 is the target unoccupied parking place. For another example, the on-board computer of the vehicle 110 detects that the driver performs click targeting an indication image of the unoccupied parking place 826, the on-board computer of the vehicle 110 determines that the unoccupied parking place 826 is the target unoccupied parking place. In some embodiments, the mobile device 120 and/or the vehicle 110 sends the determined target unoccupied parking place to a server 130, so that the server 130 generates the navigation information related to the target unoccupied parking place and then sends the navigation information to the mobile device 120 and/or the vehicle 110. In some embodiments, the mobile device 120 and/or the vehicle 110 may also, on the basis of current location information of the vehicle and location information of the target unoccupied parking place, directly generate navigation information to the target unoccupied parking place.

In some embodiments, the navigation indication presented at the mobile device 120 and/or the vehicle 110, for example, includes: displaying a real-time foreground image of the vehicle on an on-board display of the vehicle 110, and superimposing at least one of navigation information and additional image (such as the clicked additional image identifying the additional information 816) on the real-time foreground image; and/or displaying at least one of the navigation information and the additional image at a front window of the vehicle 110. The above navigation instruction may be configured for guiding the mobile device 120 to the target unoccupied parking place to acquire or download the associated data associated with the target unoccupied parking place. In some embodiments, the navigation information and the additional images may be displayed at the front window of the vehicle 110, or the additional image may be displayed at the front window of the vehicle 110 without displaying the navigation information specifically. At this time, the displayed additional image may also be used to guide the vehicle to arrive at the target unoccupied parking place.

Figure 4:
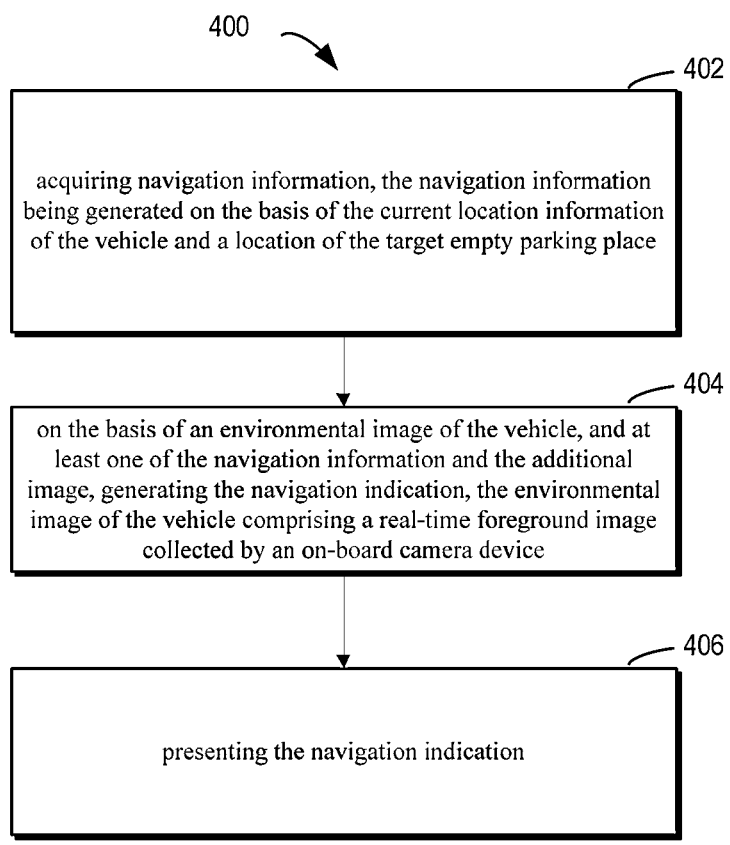
FIG. 4 illustrates a flow chart of a method 400 for generating navigation indication related to a target unoccupied parking place according to an embodiment of the present disclosure.

The specific way of generating the navigation instruction will refer to the detailed description to a method 400 for generating a navigation indication related to the target unoccupied parking place with reference to FIG. 4, and will not be repeated here.

In the foregoing solution, the unoccupied parking place and the additional information associated with the location of the unoccupied parking place are generated and presented at the vehicle 110 or the associated mobile device 120, and the navigation instruction regarding the target unoccupied parking place is generated when the operation targeting the unoccupied parking place or additional information is detected, so the present disclosure can quickly and effectively navigate the vehicle directly to the unoccupied parking place directly selected by the user or the unoccupied parking place associated with the additional information selected by the user. Therefore, the present disclosure can not only quickly and effectively guide the vehicle to the unoccupied parking place, but also help to improve the effective utilization of the parking places in the parking lot.

Figure 3:
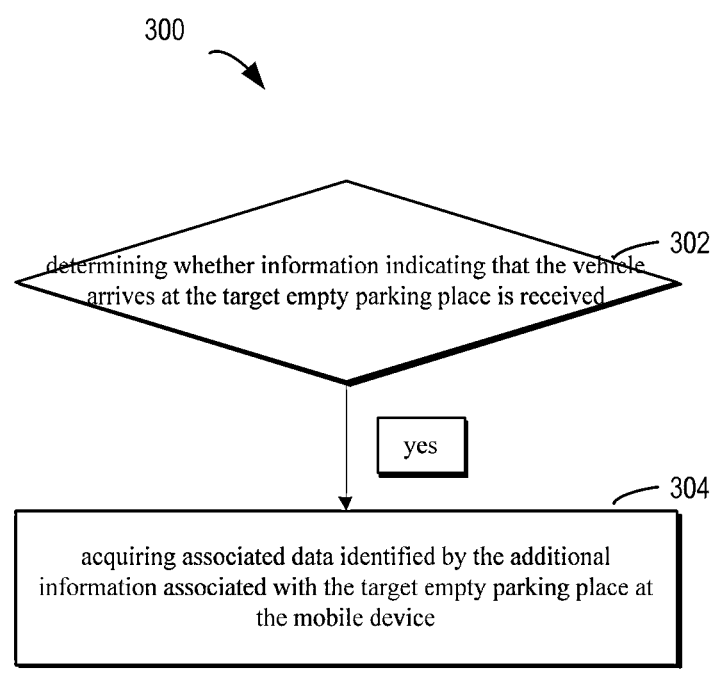
FIG. 3 illustrates a flow chart of a method 300 for acquiring associated data according to an embodiment of the present disclosure.

In some embodiments, the method 200 may also include a method 300 for acquiring associated data. FIG. 3 illustrates a flow chart of the method 300 for acquiring the associated data according to an embodiment of the present disclosure. It should be understood that the method 300, for example, may be performed at an electronic device 1000 described in FIG. 10. The method may also be executed at the mobile device 120 described in FIG. 1 or at the on-board computer of the vehicle 110. It should be understood that the method 300 may further include additional actions which are not shown and/or the illustrated actions may be omitted, and the scope of the present disclosure is not limited in this respect.

At box 302, the mobile device 120 determines whether information indicating that the vehicle 110 arrives at the target unoccupied parking place is received. In some embodiments, if the server 130 determines that the vehicle 110 is already parked in the target unoccupied parking place (e.g., unoccupied parking place 826), the information indicating that the vehicle 110 arrives at a location of the target unoccupied parking place is sent to the mobile device 120, so as to allow the mobile device 120 of the user to download associated data of additional information 816 associated with the target unoccupied parking place 826.

At box 304, if the mobile device 120 determines that the information indicating that the vehicle arrives at the target unoccupied parking place is received, the associated data identified by the additional information associated with the target unoccupied parking place is acquired at the mobile device 120. For example, if the mobile device 120 receives the information sent by the server 130 indicating that the vehicle 110 arrives at the target unoccupied parking place 826, the associated data identified by the additional information 816 associated with the target unoccupied parking place may be downloaded. The associated data, for example, is transaction discount data of the associated object. By adopting the above means, it is beneficial to guide the user to actually park the vehicle on the unoccupied parking place associated with the additional information.

Figure 7:
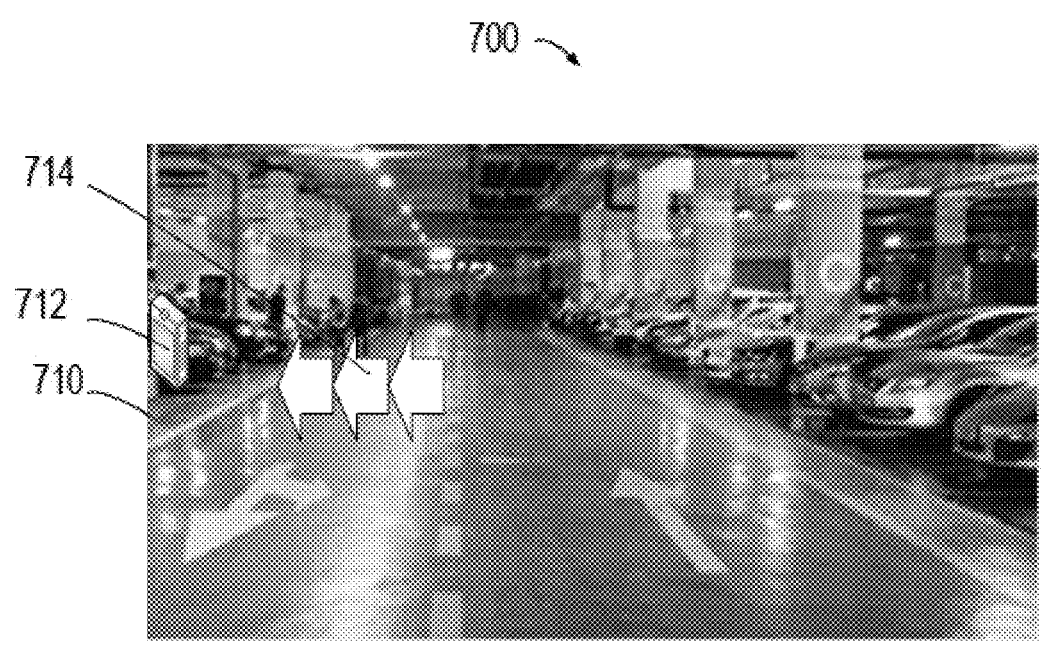
FIG. 7 illustrates a schematic diagram of a navigation indication 700 according to an embodiment of the present disclosure.

In some embodiments, the method 200 may also include a method 400 for generating a navigation indication related to the target unoccupied parking place. The method 400 for generating the navigation indication related to the target unoccupied parking place is illustrated hereinafter with reference to FIG. 4, FIG. 7 and FIG. 9. FIG. 4 illustrates a flow chart of the method 400 for generating the navigation indication related to the target unoccupied parking place according to an embodiment of the present disclosure. FIG. 7 illustrates a schematic diagram of a navigation indication 700 according to an embodiment of the present disclosure. It should be understood that the method 400, for example, may be performed at an electronic device 1000 described in FIG. 10. The method may also be executed at the mobile device 120 described in FIG. 1 or at the on-board computer of the vehicle 110. It should be understood that the method 400 may further include additional actions which are not shown and/or the illustrated actions may be omitted, and the scope of the present disclosure is not limited in this respect.

At box 402, the mobile device 120 and/or the on-board computer of the vehicle 110 acquires navigation information, the navigation information being generated on the basis of the current location information of the vehicle and the location of the target unoccupied parking place.

The current location information of the vehicle may be determined in the following ways.

In some embodiments, the mobile device 120 and/or the vehicle 110 may, on the basis of a GPS signal of the vehicle at an entrance of the parking lot, mileage data of the vehicle 110 and angular motion information of a gyroscope, determine the current location information of the vehicle. The gyroscope is an angular motion detection device that uses a momentum-moment sensitive shell of a high-speed rotating body to rotate around one or two axes orthogonal to an axis of rotation relative to inertial space. The angular motion information of the gyroscope may indicate a driving direction and an angular velocity of the vehicle. For example, the mobile device 120 and/or the vehicle 110 acquires the GPS signal of the vehicle 110 at the entrance of the parking lot, and real-time data of a vehicle mile meter of the vehicle 110 and angular motion data of the gyroscope. On the basis of the above data, the mobile device 120 and/or the vehicle 110 may calculate a driving distance and a driving trajectory of the current vehicle 110 for determining a current location of the vehicle 110 in the parking lot. Because the GPS signal of the indoor or the underground parking lot is weak, the angular motion information of the gyroscope of the vehicle 110 is not affected by the indoor or the underground parking lot. By combining the GPS signal of the vehicle 110 at the entrance of the parking lot with the mileage of the vehicle 110 and acceleration information of the gyroscope to determine the current location information of the vehicle 110, the current location information of the vehicle 110 can be determined quickly and accurately, which is not affected by the weak GPS signal and is beneficial to reducing the calculation amount.

In some embodiments, the server 130 may also determine the current location information of the vehicle 110 on the basis of a detection signal of a locating device 176 fed back by at least one of the vehicle 110 and the mobile device 120. For example, a plurality of locating devices (such as bluetooth locating devices or iBeacon locating devices) for transmitting locating signals may be pre-configured at a plurality of predetermined locations in each of a plurality of floors of the parking lot, so that the signals transmitted by the plurality of locating devices (such as bluetooth signals) can cover the plurality of floors of the parking lot. The server 130 may record the location of each of the plurality of locating devices as a locating reference location in advance, and may identify each locating device on the basis of the signals of the locating devices. The mobile device 120 and/or the on-board computer of the vehicle 110 has a bluetooth communication module, which may send the detection signals of the plurality of locating devices passed and detected by the vehicle 110 during driving in the parking lot to the server 130 (for example, sending the detection signals to the server 130 in real time, or sending the packaged detection signals to the server 130 via a transitional device at a predetermined time interval). The server 130 may determine the current location of the mobile device 120 and/or the vehicle 110 in the parking lot and the route traversed by the mobile device 120 and/or the vehicle 110 on the basis of intensities of detection signals of the signals of the plurality of locating devices sent by the mobile device 120 and/or the vehicle 110 and the locating reference locations of the plurality of locating devices. By adopting the above-mentioned means, it is possible to accurately identify the current location of the vehicle and navigate the vehicle to the target location in a underground garage with poor GPS signals. In addition, because a low-power bluetooth locating device may be used as the locating device, the current location of the vehicle can be accurately identified and navigated to the target location by means of low energy consumption.

In some embodiments, the server 130 may also determine the current location information of the vehicle 110 on the basis of an acquired video image collected by a camera device of the parking lot, the video image at least including license plate information of the vehicle 110.

In some embodiments, the vehicle 110 may also determine the current location information of the vehicle 110 on the basis of at least one of a cylindrical tag of the parking lot and a serial number of a ground parking place identified in the environmental image of the vehicle collected by collected by the on-board camera device. For example, the on-board computer of the vehicle 110 recognizes at least one of a tag on a post in the environmental image (e.g., C and two-dimensional code on the post in FIG. 7) and the serial number of the ground parking place, so as to determine the current location of the vehicle 110. For example, the on-board computer of the vehicle 110 may determine that the vehicle 110 is currently driving on a second floor underground of the parking lot based on the tag "C" on the post in FIG. 700, and may determine the current driving location of the vehicle 110 on the basis of a serial number of the nearest ground parking place not blocked by the vehicle in FIG. 7 (for example, a parking place with a serial number of 40 in FIG. 8).

At box 404, the mobile device 120 and/or the on-board computer of the vehicle 110, on the basis of an environmental image of the vehicle, and at least one of the navigation information and the additional image, generates the navigation indication, the environmental image of the vehicle including a real-time foreground image collected by an on-board camera device. In some the ways of generating navigation instructions may include the following.

In some embodiments, the on-board computer of the vehicle 110 may, on the basis of map information of the parking lot and the current location information of the vehicle, first determine a current motion state of the vehicle and an actual distance that needs to change the motion state; then, on the basis of predetermined pixel distance calibration of the on-board camera device, convert the actual distance that needs to change the motion state into a pixel distance in the image collected by the on-board camera device; and finally, on the basis of the current motion state and the pixel distance, draw the navigation guide image. For example, the on-board computer of the vehicle 110 may, on the basis of the map information of the parking lot acquired from the server and the calculated the current location information of the vehicle, determine the current motion state of the vehicle 110 (the current motion state of the vehicle such as but not limited to going straight and turning) and the actual distance that the vehicle needs to change the motion state (e.g., expressed as X). Then, the on-board computer of the vehicle 110 may, on the basis of the predetermined pixel distance calibration of the on-board camera device, convert the determined actual distance X that needs to change the motion state, so as to convert the actual distance X that needs to change the motion state to a pixel distance i in the image collected by the on-board camera device. After that, the on-board computer of the vehicle 110 may (for example, through a classification network) draw a navigation guide image at a line (which corresponds to the actual distance X that needs to change the motion state at the location of the point in the image collected by the on-board camera device) where the pixel distance i in the image collected by the on-board camera device locates, for example, draw a navigation guide image 714 of a direction shown in FIG. 7 at $i^{th}$ and $(i+n)^{th}$ lines (n is a natural number).

In some embodiments, the distance navigation guide image is, for example, a segment or a numerical value with a certain length, wherein the length of the segment or the numerical value is, for example, proportional to a distance from next intersection to the current location of the vehicle. The direction navigation guide image is, for example, an arrow (e.g., direction navigation guide image 714) for indicating turning left or turning right, and a location of the direction indicated by the arrow displayed on the on-board display is proportional to the distance from next intersection to the current location of the vehicle.

Figure 9:
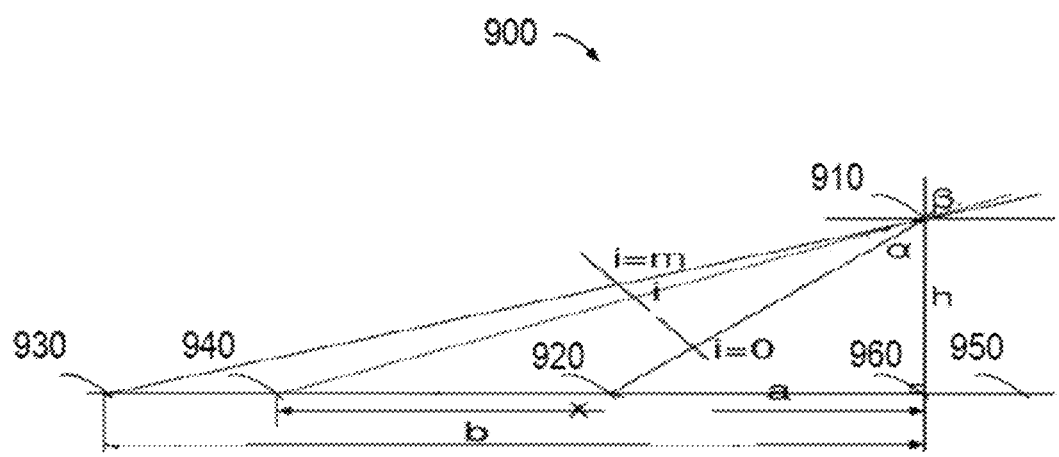
FIG. 9 illustrates a schematic diagram of a method for determining predetermined pixel distance calibration according to an embodiment of the present disclosure.

The predetermined pixel distance calibration may be predetermined. The way of determining the predetermined pixel distance calibration is illustrated hereinafter with reference to FIG. 9. FIG. 9 illustrates a schematic diagram of the method for determining the predetermined pixel distance calibration according to an embodiment of the present disclosure. As shown in FIG. 9, after the on-board camera device is fixed at a location 910 on the vehicle 110, a near point 920 and a far point 930 are selected on a ground 950 in front of the on-board camera device (i.e., the traveling direction of the vehicle), and then actual distances respectively from the near point 920 and the far point 930 to a reference point 960 are measured. Then, on the basis of a height h of the on-board camera device from the ground 950, and an actual distance of a location corresponding to each row of pixels in the image captured by the on-board camera device is calculated, so as to determine the predetermined pixel distance calibration of the on-board camera device. Then, marks are respectively placed at a plurality of selected points with different actual distances (for example, 5 meters, 10 meters and 15 meters) on the ground 950 in front of the on-board camera device, so as to verify whether the determined predetermined pixel distance calibration of the on-board camera device is accurate. In some embodiments, the on-board camera device has a wide field of view, which is prone to distortion. A checkerboard calibration method may be used to eliminate the distortion caused by the wide field of view of the on-board camera device.

As for the previous conversion from the distance to the pixel distance, in some embodiments, the on-board computer of the vehicle 110 may convert the determined actual distance X that needs to change the motion state into pixel coordinates in the image acquired by the on-board camera device on the basis of a height, a shooting angle and a shooting range of the on-board camera device, so as to superimpose the navigation guide image (such as the direction navigation guide image 714) on the real-time foreground image as shown in FIG. 7. In some embodiments, the determined actual distance X that needs to change the motion state may be converted into the pixel distance i in the image captured by the on-board camera device according to the following formula (1).

$$i = \left(\mathrm{arctg}\left(\frac{x}{h}\right) - \alpha\right) * \frac{m}{\beta - \alpha} + p\alpha \tag{1}$$

In the above formula (1), $\alpha$ represents an included angle between a connecting line of the near point 920 and a fixed location 910 of the on-board camera device relative to a vertical direction; $\beta$ represents an included angle between a connecting line of the far point 930 and the fixed location 910 of the on-board camera device relative to the vertical direction; h represents a height of the on-board camera device from the ground 950; m represents a number of pixel rows between the near point 920a and the far point 930 in the image captured by the on-board camera device; P$\alpha$ represents a number of lines of the near point 920 in the image captured by the on-board camera device; X represents the actual distance that the vehicle needs to change the motion state; and i represents a pixel distance in the image captured by the on-board camera device corresponding to the actual distance X.

The method of determining the included angle $\alpha$ between the connecting line of the near point 920 and the fixed location 910 of the on-board camera device relative to the vertical direction is illustrated hereinafter with reference to the formula (2).

$$\alpha = \mathrm{arctg}\left(\frac{a}{h}\right) \tag{2}$$

The method of determining the included angle $\beta$ between the connecting line of the far point 930 and the fixed location 910 of the on-board camera device relative to the vertical direction is illustrated hereinafter with reference to the formula (3).

$$\beta = \mathrm{arctg}\left(\frac{b}{h}\right) \tag{3}$$

In the above formulas (2) and (3), a represents a distance between the near point 920 and the reference point 960; b represents a distance between the far point 930 and the reference point 960; and h represents the height of the on-board camera device from the ground 950.

In the above solution, by superimposing the navigation guide image on the real-time foreground image, it is possible to create an augmented reality navigation frame that can guide a real vision of the driver during driving in the underground parking lot.

In some embodiments, the on-board computer of the vehicle 110 may draw an additional image at a predetermined distance from a location where the navigation guide image is drawn in the image collected by the on-board camera device, so as to superimpose the additional image on the real-time foreground image. By superimposing the additional image on the real-time foreground image, the driver can be guided to the target unoccupied parking place associated with the additional information in an augmented reality way. In some embodiments, only the additional image is superimposed on the real-time foreground image without superimposing the navigation guide image. The method of drawing the additional image can refer to the method of drawing the navigation guide image mentioned above.

At box 406, the mobile device 120 and/or the on-board computer of the vehicle 110 presents the navigation indication at the mobile device 120 and/or the on-board display of the vehicle 110. By adopting the above means, the driver can be intuitively guided to do key driving actions, such that the efficiency of the user to quickly find the target unoccupied parking place is improved.

In some embodiments, the mobile device 120 and/or the vehicle 110 may display the real-time foreground image of the vehicle at the on-board display of the vehicle, and superimpose a navigation guide image for indicating the navigation information and an additional image. In some embodiments, the vehicle 110 displays the navigation guide image and the additional image at a front window of the vehicle 110. In some embodiments, the presented navigation guide image, for example, includes at least one of an arrow, a segment and a numerical value for indicating the navigation information of next intersection or the target unoccupied parking place relative to the current location of the vehicle, as shown in FIG. 7. The navigation indication 700 in FIG. 7, for example, is displayed on the on-board display of the vehicle 110. The navigation instruction 700 displays a vehicle foreground image and a navigation guide image (e.g., an additional image such as a commodity image 712 associated with the arrow 714 and the additional information selected by the user). The navigation guide image (e.g., the arrow 714) and the additional image (e.g., the commodity image 712) are used to guide a location of the target unoccupied parking place 710.

Figure 5:
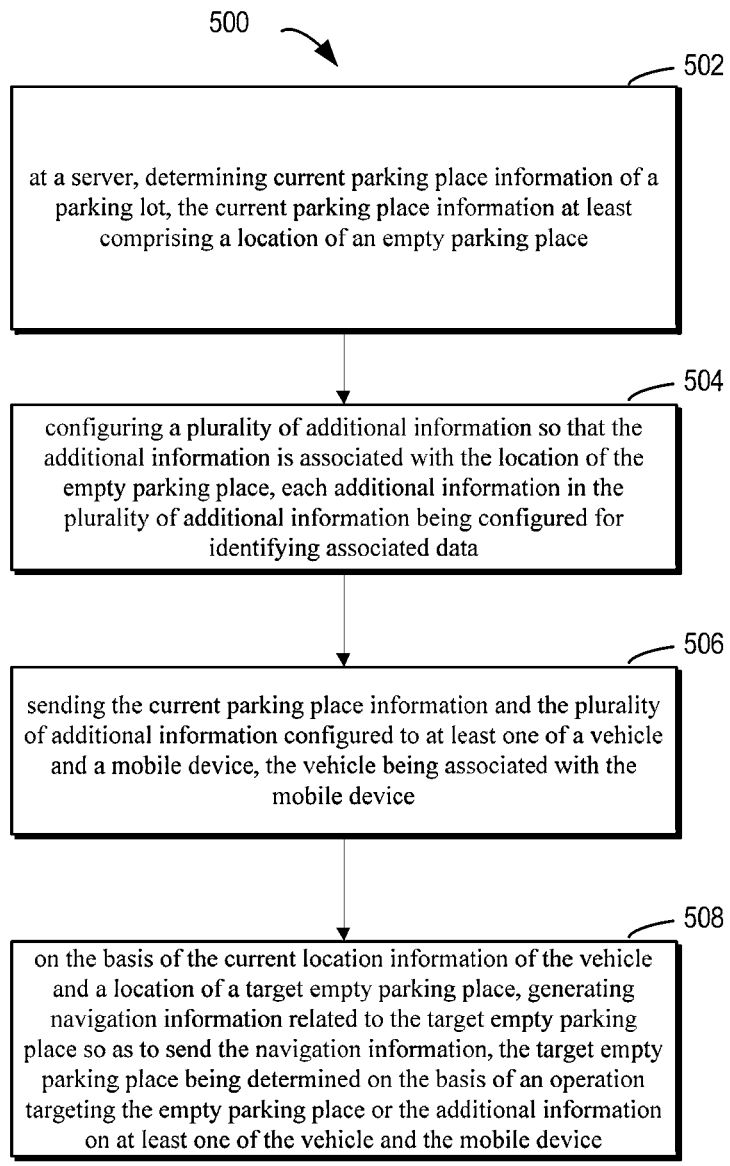
FIG. 5 illustrates a flow chart of a vehicle parking management method 500 according to an embodiment of the present disclosure.

A vehicle parking management method according to an embodiment of the present disclosure will be described below with reference to FIG. 5. FIG. 5 illustrates a flow chart of the vehicle parking management method 500 according to the embodiment of the present disclosure. It should be understood that the method 500, for example, may be performed at an electronic device 1000 described in FIG. 10. The method may also be executed at the server 130 described in FIG. 1. It should be understood that the method 500 may further include additional actions which are not shown and/or the illustrated actions may be omitted, and the scope of the present disclosure is not limited in this respect.

At box 502, the server 130 determines current parking place information of a parking lot, the current parking place information at least including a location of an unoccupied parking place. In some embodiments, the server 130 may, on the basis of images collected by a plurality of camera devices 172 of the parking lot, determine the current parking place information of the parking lot, for example, determining the location of the unoccupied parking place.

At box 504, the server may configure a plurality of additional information so that the additional information is associated with the location of the unoccupied parking place, each additional information in the plurality of additional information being configured for identifying associated data.

The server 130 may configure the additional information in various ways. In some embodiments, the server 130 may determine association between the additional information and the unoccupied parking place on the basis of a distance from an associated object (e.g., a merchant in a mall where the parking lot is located) to the unoccupied parking place. For example, if the server 130 determines that the distance from the location of the associated object of the additional information to the location of the unoccupied parking place is less than or equal to a predetermined first distance, the additional information is determined to be associated with the unoccupied parking place. By adopting the above means, it is possible to recommend a matching unoccupied parking place to the user according to the distance from the related associated object concerned by the user.

In some embodiments, if the server 130 determines that a distance between the location of the unoccupied parking place and a predetermined location is more than or equal to a predetermined second distance, the plurality of additional information is determined to be associated with the unoccupied parking place. For example, for an unoccupied parking place far away from an elevator location of the parking lot, the server 130 may configure more additional information to be associated with the far unoccupied parking place, or configure additional information indicating a higher discount ratio to be associated with the far unoccupied parking place. By adopting the above means, the user can be guided to choose the unoccupied parking place with a long distance, so as to make the parking places in the parking lot more balanced without being too concentrated.

At box 506, the server 130 transmits the current parking place information and the configured plurality of additional information to at least one of the vehicle 110 and the mobile device 120, wherein the vehicle 110 is associated with the mobile device 120.

At box 508, the server 130, on the current location information (e.g., an entrance of the parking lot) of the vehicle 110 and a location of a target unoccupied parking place (e.g., selected unoccupied parking place 174-1), generates navigation information related to the target unoccupied parking place, so as to send the navigation information. The target unoccupied parking place (e.g., the unoccupied parking place 174-1) may be determined on the basis of a user operation targeting the unoccupied parking place or the additional information on at least one of the vehicle 110 and/or the mobile device 120, and the target unoccupied parking place is acquired from at least one of the vehicle 110 and/or the mobile device 120.

As for the acquisition of the target unoccupied parking place, in some embodiments, if the vehicle 110 and/or the mobile device 120 detects a user operation targeting at least one of the unoccupied parking place and the additional information on an parking place distribution image, the unoccupied parking place associated with the unoccupied parking place targeted by the user operation or the additional information targeted by the user operation is sent to the server 130 as the target unoccupied parking place.

In the foregoing solution, the server 130 determines the current parking place information of the parking lot, configures the plurality of additional information to be associated with the location of the unoccupied parking place, and generates the navigation instruction regarding the target unoccupied parking place so as to send the navigation instruction. The present disclosure can not only quickly and effectively guide the vehicle to the unoccupied parking place, but also help to improve the effective utilization of the parking places in the parking lot.

In some embodiments, the method 500 further includes: if the server 130 detects that the vehicle 110 is already parked in the target unoccupied parking place, the mobile device 120 of the user may be allowed to acquire (e.g., download) transaction discount data of additional information associated with the target unoccupied parking place. For example, if the server 130 determines that the vehicle 110 is already parked in the target unoccupied parking place, information indicating that the vehicle arrives at the target unoccupied parking place is sent to at least one of the vehicle 110 and the mobile device 120 so as to acquire associated data identified by the additional information associated with the target unoccupied parking place at the mobile device 120.

The method of determining that the vehicle is already parked in the target unoccupied parking place may include the following.

In some embodiments, the server 130 may acquire a video image indicating the target unoccupied parking place, the video image being acquired by a camera device associated with the target unoccupied parking place in the parking lot. After that, the server, on the basis of the video image, determines whether the vehicle already occupies more than a predetermined proportion of the target unoccupied parking place; and if the server 130 determines that the vehicle 110 already occupies more than the predetermined proportion of the target unoccupied parking place and the vehicle is already in a flameout state, then the server 130 determines that the vehicle 110 is already parked in the target unoccupied parking place, the vehicle is already in the flameout state being acquired from the vehicle 110. By adopting the above means, the present disclosure can determine whether the vehicle 110 is already parked in place without arranging a sensor above each parking place.

In some embodiments, the server 130 may, in a plurality of locating devices 176-1 to 176-M (the plurality of locating devices are arranged at a plurality of predetermined locations in the parking lot), determine a locating device with a distance from the target unoccupied parking place (for example, the unoccupied parking place 174-1) less than a predetermined distance threshold as a target locating device (for example, 176-1). Then, the server 130 determines whether a detection signal of a locating device fed back by at least one of the mobile device 120 and the mobile device 110 includes a detection signal of the target locating device (for example, 176-1). If the server 130 determines that the detection signal of the locating device fed back by at least one of the mobile device 120 and the mobile device 110 includes the detection signal of the target locating device, then it is determined that whether an intensity of the detection signal of the target locating device belongs to a predetermined range; and if it is determined that the intensity of the detection signal of the target locating device belongs to the predetermined range and the vehicle is already in the flameout state, it is determined that the vehicle 110 is already parked in the target unoccupied parking place. The vehicle is already in the flameout state is acquired from the vehicle 110. For example, when the vehicle is already parked in the target unoccupied parking place, the mobile device 120 and/or the vehicle 110 with a bluetooth communication module may detect the detection signals of a plurality of locating devices with a bluetooth coverage area covering the target unoccupied parking place. The signal intensity of each detection signal depends on a distance from the mobile device 120 and/or the vehicle 110 to the locating device. Therefore, the server 130 may determine that the locating device closest to the target unoccupied parking place is the target locating device related to the target unoccupied parking place. If the server 130 determines that the intensity of the detection signal of the target locating device fed back by the mobile device 120 and/or the mobile device 110 belongs to the predetermined range and the vehicle 110 is already in the flameout state, it may be determined that the vehicle 110 is already parked in the target unoccupied parking place. Compared with the traditional way of determining that the vehicle is already parked by arranging a camera or sensor above each parking place, by adopting the above means, the present disclosure can determine whether the vehicle 110 is parked in place with low energy consumption.

In some embodiments, the server 130 may acquire information regarding that the vehicle 110 is already parked in the target unoccupied parking place from the vehicle 110 or the mobile device 120. This information is determined, for example, on the basis that the distance from the current location of the vehicle is less than the predetermined range.

In some embodiments, the server 130 may update the current parking place information in real time.

In some embodiments, the server 130 may also, after determining that the vehicle is already parked in the target unoccupied parking place and the vehicle has stalled, record the location of the target unoccupied parking place (for example, the server 130 records the detection signal of the locating device sent by the mobile device 120 and/or the vehicle 110 when the vehicle is already parked in the target unoccupied parking place and the vehicle has stalled, and determines the location of the target free parking place on the basis of the detection signal at this time), and sends the location of the target unoccupied parking place to the mobile device 120 for the mobile device 120 to query a parking location of the vehicle 110. In some embodiments, when a query request for querying the parking location is detected at the mobile device 120, navigation information is generated for the user to find the parked vehicle 110 in the parking lot on the basis of the current location of the mobile device 120 and the location of the target unoccupied parking place. By adopting the above means, the mobile device 120 can be conveniently used for inquiring and navigating the parking location.

Figure 6:
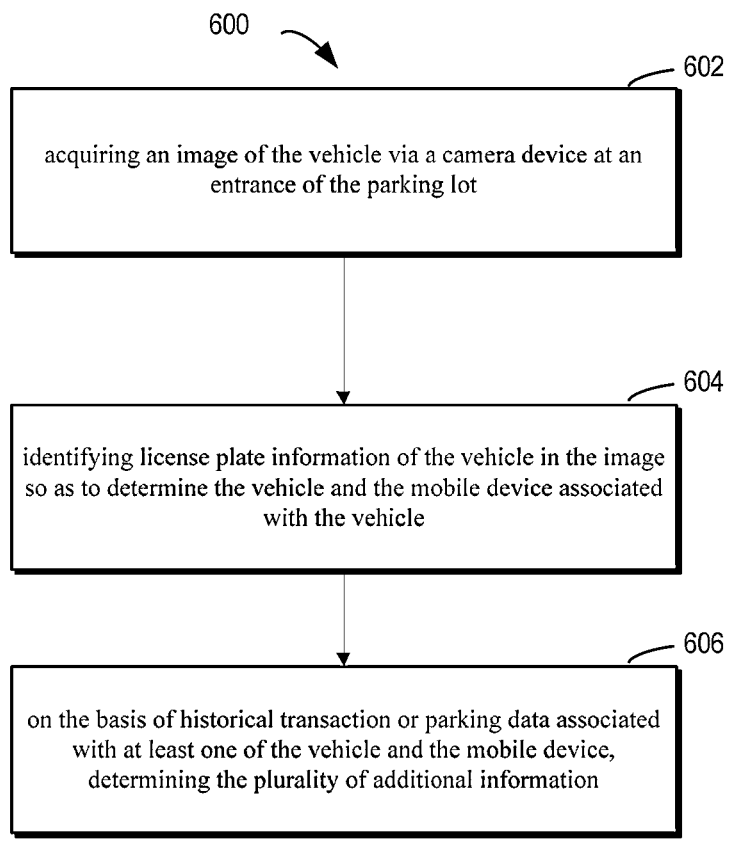
FIG. 6 illustrates a flow chart of a method 600 for determining additional information according to an embodiment of the present disclosure.

In some embodiments, the method 500 also includes a method 600 of determining additional information. FIG. 6 illustrates a flow chart of the method 600 for determining the additional information according to an embodiment of the present disclosure. It should be understood that the method 600, for example, may be performed at an electronic device 1000 described in FIG. 10. The method may also be executed at the server 130 described in FIG. 1. It should be understood that the method 600 may further include additional actions which are not shown and/or the illustrated actions may be omitted, and the scope of the present disclosure is not limited in this respect.

At box 602, the server 130 acquires an image of the vehicle via a camera device 172-1 at the entrance of the parking lot.

At box 604, the server 130 identifies license plate information of the vehicle 110 in the image, so as to determine the vehicle 110 and the mobile device 120 associated with the vehicle 110. In some embodiments, the server 130 may acquire vehicle information of the vehicle 110 associated with the identified license plate information and information of the mobile device 120 associated with the vehicle through locally stored data or via the server 160. In some embodiments, the server 130 also identifies other vehicle feature information (e.g., vehicle type information) of the vehicle 110 in the image, and tracks the location of the vehicle 110 in the parking lot on the basis of the vehicle feature information.

At box 606, the server 130, on the basis of historical transaction or parking data associated with at least one of the vehicle 110 and the mobile device 120, determines a plurality of additional information. For example, if the server 130, on the basis of the historical transaction data associated with the vehicle 110 or the mobile device 120, determines that the vehicle 110 or the mobile device 120 often purchases goods in a supermarket, then the server 130 may preferentially configure additional information identifying supermarket coupons to be associated with the unoccupied parking place. By adopting the above means, the recommended unoccupied parking place and additional information match consumption habits of the user. For example, if the server 130, on the basis of the historical parking data associated with the vehicle 110 or the mobile device 120, determines that the vehicle 110 often stops at unoccupied parking places with charging piles and the unoccupied parking places in the parking lot include rechargeable parking places, the additional information associated with the charging piles is determined to be associated with the corresponding unoccupied parking place.

Figure 10:
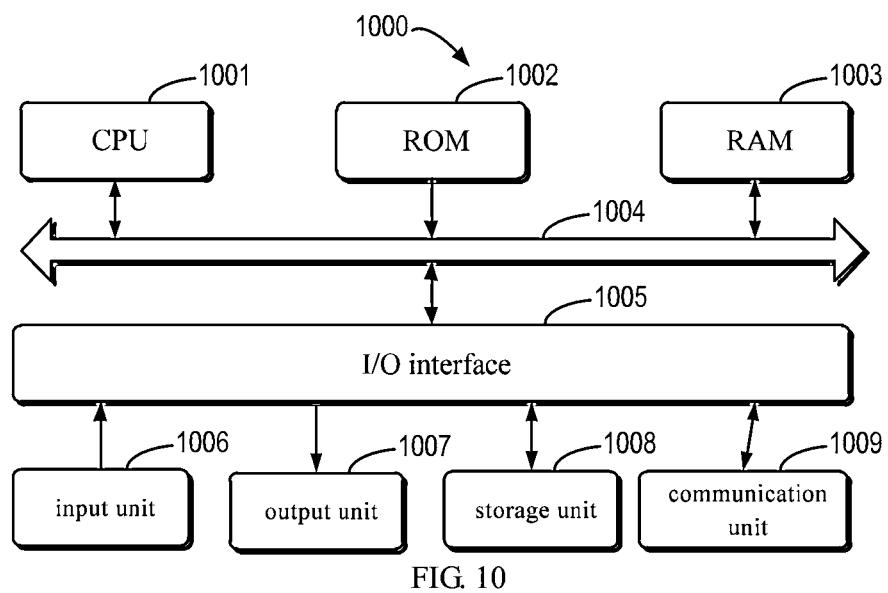
FIG. 10 schematically illustrates a block diagram of an electronic device 1000 suitable for implementing the embodiments of the present disclosure.

FIG. 10 schematically illustrates a block diagram of an electronic device 1000 suitable for implementing the embodiments of the present disclosure. The device 1000 may be a device for implementing the methods 200, 300, 400, 500 and 600 shown in FIGS. 2 to 6. As shown in FIG. 10, the device 1000 includes a central processing unit (CPU) 1001, which can perform various appropriate actions and processes according to a computer program instruction stored in a read-only memory (ROM) 1002 or loaded from a storage unit 1008 into a random access memory (RAM) 1003. In the RAM 1003, various programs and data needed for operating the device 1000 may also be stored. The CPU 1001, the ROM 1002, and the RAM 1003 are connected to each other through a bus 1004. An input/output (I/O) interface 1005 is also connected to the bus 1004.

A plurality of components in the device 1000 are connected to the I/O interface 1005, including: an input unit 1006, an output unit 1007, and a storage unit 1008. The processing unit 1001 executes various methods and processes described above, such as executing the methods 200, 300, 400, 500, and 600. For example, in some embodiments, the methods 200, 300, 400, 500 and 600 may be implemented as a computer software program, which is tangibly embodied in a machine-readable medium, such as the storage unit 1008. In some embodiments, a part or all of the computer program may be loaded and/or installed on the device 1000 via the ROM 1002 and/or the communication unit 1009. When the computer program is loaded into the RAM 1003 and executed by the CPU 1001, one or more operations of the methods 200, 300, 400, 500, and 600 described above may be executed. Alternatively, in other embodiments, the computing unit 1001 may be configured to execute one or more operations of the methods 200, 300, 400, 500, and 600 by any other suitable means (for example, by means of firmware).

It should be further illustrated that the present disclosure may be a method, an apparatus, a system and/or a computer program product. The computer program product may include a computer-readable storage medium carrying a computer-readable program instruction for performing various aspects of the present disclosure.

The computer-readable storage medium may be a tangible device that can hold and store an instruction used by an instruction executing device. The computer-readable storage medium may be, for example, but not limited to, an electrical storage device, a magnetic storage device, an optical storage device, an electromagnetic storage device, a semiconductor storage device, or any suitable combination of the above. More specific examples (non-exhaustive list) of the computer-readable storage medium include: a portable computer disk, a hard disk, a random access memory (RAM), a read-only memory (ROM), an erasable programmable read-only memory (ROM) (EPROM or flash memory), a static random access memory (SRAM), a portable compact disc read-only memory (CD-ROM), a digital versatile disc (DVD), a memory stick, a floppy disc, a mechanical coding device, such as a punch card or a bulge structure in a groove on which an instruction is stored, or any suitable combination of the above. The computer-readable storage medium used here is not interpreted as instantaneous signals, such as radio waves or other freely propagated electromagnetic waves, electromagnetic waves propagated through waveguides or other transmission media (for example, light pulses through fiber optic cables), or electrical signals transmitted through electric wires.

The computer-readable storage medium used here may be downloaded from a computer-readable storage medium to various computing/processing devices, or downloaded to an external computer or an external storage device through a network, such as the Internet, a local area network, a wide area network, and/or a wireless network. The network may include a copper transmission cable, optical fiber transmission, wireless transmission, a router, a firewall, a switch, a gateway computer and/or an edge server. A network adapter card or network interface in each computing/processing device receives a computer-readable program instruction from the network and forwards the computer-readable program instruction for storage in the computer-readable storage medium in each computing/processing device.

The computer program instruction for performing operations of the present disclosure may be an assembly instruction, an Instruction Set Architecture (ISA) instruction, a machine instruction, a machine-related instruction, a microcode, a firmware instruction, status setting data, or a source code or an object code written in one programming language or any combination of more programming languages. The programming languages include object-oriented programming languages such as Smalltalk, C++, and conventional procedural programming languages such as "C or similar programming languages. The computer-readable program instructions may be executed entirely on a user computer, partially executed on the user computer, executed as an independent software package, partially executed on the user computer and partially executed on a remote computer, or entirely executed on the remote computer or a server. In the case of involving in the remote computer, the remote computer can be connected to the user computer via any kind of network, including a local area network (LAN) or a wide area network (WAN), or can be connected to an external computer (e.g., connected via the Internet using an Internet service provider). In some embodiments, electronic circuits, such as a programmable logic circuit, a field programmable gate array (FPGA), or a programmable logic array (PLA), can be customized by utilizing the status information of the computer-readable program instruction. The electronic circuits can execute the computer-readable program instruction, thereby implementing various aspects of the present disclosure.

Various aspects of the present disclosure have been described with reference to the flow charts and/or block diagrams of the method, device (system), and computer program products according to the embodiments of the present disclosure. It should be understood that each block of the flow chart and/or block diagram and combinations of the blocks in the flow chart and/or block diagram can be implemented by computer-readable program instructions.

These computer-readable program instructions may be provided to a processor in a voice interaction apparatus, a general purpose computer, a special purpose computer, or a processing unit of other programmable data processing device to produce a machine for the instructions executed by the computer or the processing unit of other programmable data processing device to generate an apparatus for implementing the functions specified in one or more flows of the flow chart and/or in one or more blocks of the block diagram. These computer-readable program instructions may also be stored in a computer-readable memory that can guide the computer, the programmable data processing device and/or other apparatus to work in a given manner, so that the computer-readable medium stored with instructions includes a product including an instruction that implements various aspects of the functions/actions specified in one or more blocks of the flow chart and/or block diagram.

These computer-readable program instructions may also be loaded to a computer, other programmable data processing device, or other apparatus, so that a series of operating steps are executed on the computer, the other programmable data, or the other apparatus to produce processing implemented by the computer, so that the instructions executed in the the other programmable data, or the other apparatus implement the functions/actions specified in one or more blocks of the flow chart and/or block diagram.

The flow charts and block diagrams in the drawings show the possibly implemented architectures, functions, and operations of the device, the method and the computer program product according to multiple embodiments of the present disclosure. In this regard, each block in the flow chart or block diagram may represent one module, one program segment, or a part of an instruction. The module, the program segment, or the part of an instruction contains one or more executable instructions for implementing specified logical functions. In some alternative implementations, the functions noted in the blocks may also occur in a different order from those noted in the drawings. For example, two consecutive blocks may actually be executed in substantially parallel, and sometimes may be executed in reverse order, depending on the functions involved. It should also be noted that each block in the block diagrams and/or flow charts, and combinations of the blocks in the block diagrams and/or flow charts, may be implemented with dedicated hardware-based systems that perform specified functions or actions, or may be implemented with combinations of dedicated hardware and computer instructions.

Various embodiments of the present disclosure have been described above, and the above description is exemplary, not exhaustive, and is not limited to the disclosed embodiments. Many modifications and variations will be apparent to those of ordinary skills in the art without departing from the scope and spirit of the illustrated embodiments. Terms used herein are selected to best explain the principles and practical applications of various embodiments or technical improvements to technologies in the market, or to enable other people of ordinary skills in the art to understand various embodiments disclosed herein.

The above descriptions are only optional embodiments of the present disclosure, and are not used to limit the present disclosure. Many modifications and variations will be apparent to those of ordinary skills in the art. Any change, equivalent substitution, and improvement made within the spirit and principle of the present disclosure shall fall within the protection scope of the present disclosure.

The invention claimed is:

1. A vehicle parking management method, comprising:
at a server, determining current parking place information of a parking lot, the current parking place information at least comprising a location of an unoccupied parking place;
configuring a plurality of additional information so that the additional information is associated with the location of the unoccupied parking place, each additional information in the plurality of additional information being configured for identifying associated data;
sending the current parking place information and the plurality of additional information configured to at least one of a vehicle and a mobile device, the vehicle being associated with the mobile device; and
on the basis of the current location information of the vehicle and a location of a target unoccupied parking place, generating navigation information related to the target unoccupied parking place so as to send the navigation information, the target unoccupied parking place being determined on the basis of an operation targeting the unoccupied parking place or the additional information on at least one of the vehicle and the mobile device;
the step of configuring the plurality of additional information comprises at least one of the following:
in response to determining that a distance between a location of an associated object of the additional information and the location of the unoccupied parking place is less than or equal to a predetermined first distance, determining that the additional information is associated with the unoccupied parking place; and
in response to determining that a distance between the location of the unoccupied parking place and a predetermined location is more than or equal to a predetermined second distance, determining that the plurality of additional information is associated with the unoccupied parking place.

2. The method according to claim 1, further comprising:
acquiring an image of the vehicle via a camera device at an entrance of the parking lot;
identifying license plate information of the vehicle in the image so as to determine the vehicle and the mobile device associated with the vehicle; and
on the basis of historical transaction or parking data associated with at least one of the vehicle and the mobile device, determining the plurality of additional information.

3. The method according to claim 2, further comprising:
in response to determining that the vehicle is already parked in the target unoccupied parking place, sending information indicating that the vehicle arrives at the target unoccupied parking place to at least one of the vehicle and the mobile device so as to acquire associated data identified by the additional information associated with the target unoccupied parking place at the mobile device.

4. The method according to claim 3, wherein the step of determining that the vehicle is already parked in the target unoccupied parking place comprises:
acquiring a video image indicating the target unoccupied parking place, the video image being acquired by a camera device associated with the target unoccupied parking place in the parking lot;
on the basis of the video image, determining whether the vehicle already occupies more than a predetermined proportion of the target unoccupied parking place; and
in response to determining that the vehicle already occupies more than the predetermined proportion of the target unoccupied parking place and the vehicle is already in a flameout state, determining that the vehicle is already parked in the target unoccupied parking place, the vehicle is already in the flameout state being acquired from the vehicle.

5. The method according to claim 3, wherein the step of determining that the vehicle is already parked in the target unoccupied parking place comprises:
- in a plurality of locating devices, determining a locating device with a distance from the target unoccupied parking place less than a predetermined distance threshold as a target locating device, the plurality of locating devices being arranged at a plurality of predetermined locations of the parking lot;
- in response to determining that a detection signal of a locating device fed back by at least one of the vehicle and the mobile device comprises a detection signal of the target locating device, determining whether an intensity of the detection signal of the target locating device belongs to a predetermined range; and
- in response to determining that the intensity of the detection signal of the target locating device belongs to the predetermined range and the vehicle is already in the flameout state, determining that the vehicle is already parked in the target unoccupied parking place, the vehicle is already in the flameout state being acquired from the vehicle.

6. An electronic device, comprising:
- a memory configured for storing one or more computer programs; and
- a processor coupled to the memory and configured for executing the one or more programs to cause the device to execute the method according to claim 1.

7. A non-transitory computer-readable storage medium storing a machine-executable instruction thereon, wherein the machine-executable instruction when executed, causes the machine to execute the steps of the method according to claim 1.

* * * * *